(12) United States Patent
Hatcher (10) Patent No.: US 7,360,206 B1
(45) Date of Patent: Apr. 15, 2008

(54) METHOD FOR AN INTERPRETER TO CONTROL A NATIVE FUNCTION CALL BASED ON A SIGNATURE OF THE NATIVE FUNCTION

(75) Inventor: Andrew J. Hatcher, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 574 days.

(21) Appl. No.: 10/388,988

(22) Filed: Mar. 13, 2003

(51) Int. Cl.
*G06F 9/45* (2006.01)

(52) U.S. Cl. ..................................... 717/139
(58) Field of Classification Search ................ 717/139
See application file for complete search history.

(56) References Cited

U.S. PATENT DOCUMENTS

| | | | | |
|---|---|---|---|---|
| 5,732,270 | A * | 3/1998 | Foody et al. ............... | 719/316 |
| 6,282,702 | B1 * | 8/2001 | Ungar ........................ | 717/148 |
| 6,314,445 | B1 * | 11/2001 | Poole ............................. | 718/1 |
| 6,442,752 | B1 * | 8/2002 | Jennings et al. ............ | 717/162 |
| 6,481,006 | B1 * | 11/2002 | Blandy et al. .............. | 717/139 |
| 6,748,591 | B1 * | 6/2004 | Lewallen ..................... | 717/170 |
| 6,886,157 | B2 * | 4/2005 | Long et al. .................. | 717/151 |
| 7,152,223 | B1 * | 12/2006 | Brumme et al. ............ | 717/116 |
| 2002/0066087 | A1 * | 5/2002 | Long et al. ................ | 717/148 |
| 2002/0095661 | A1 * | 7/2002 | Angel et al. ................ | 717/130 |
| 2005/0149914 | A1 * | 7/2005 | Krapf et al. ................ | 717/136 |

* cited by examiner

*Primary Examiner*—John Chavis
(74) *Attorney, Agent, or Firm*—Blakely, Sokoloff, Taylor & Zafman LLP (57) ABSTRACT

A method for implementing an interpreter comprises determining if a signature of a native function declared in code for an interpreted application matches a signature of the native function stored in a linking mechanism to link a function call to the native function in the interpreted application to native code implementing the native function; and invoking the native code only if the signatures match.

29 Claims, 7 Drawing Sheets

METHOD FOR AN INTERPRETER TO CONTROL A NATIVE FUNCTION CALL BASED ON A SIGNATURE OF THE NATIVE FUNCTION

FIELD OF THE INVENTION

This invention relates in general to computer software. In particular the invention relates to software interpreters.

BACKGROUND

One function of a software interpreter is to translate instructions of an interpreted program into equivalent instructions that can be understood by an underlying platform running the software interpreter. As used herein, the term "underlying platform" includes the particular hardware and operating system combination of a computer system on which the software interpreter runs.

Sometimes, the interpreted program may include a native function declaration and a native function call instruction to call or invoke the native function. For purposes of this specification, the term "function" is to be interpreted broadly to include any software routine, e.g., a method, subroutine, procedure, etc. A native function is a function written or implemented in a language ("native language") other than the language of the interpreted program. The interpreter calls or invokes the native function upon execution of the native function call instruction, and ensures that the correct parameters/arguments are available to underlying platform when the native function gets executed.

The native function code corresponding to each native function is normally resident in a library which may be a shared library or a dynamic link library (dll). In order to properly invoke native functions, the interpreter has a linking mechanism or interface which specifies a name, and a pointer value for each native function in the library.

The term "signature" of a native function denotes the parameters passed to the native function and the return value(s) of the native function.

In some cases, it is possible that a signature for a native function as declared in the interpreted program does not match the signature of the actual implementation of the native function in the library. If this happens, the interpreter will pass arguments for the native function based on the interpreted program declaration for the native function. These arguments will not match the arguments required by the actual implementation of native function and can lead to incorrect results or a system failure.

SUMMARY OF THE INVENTION

According to a one aspect of the invention, there is provided a method of implementing an interpreter, the method comprising determining if a signature of a native function declared in code for an interpreted application matches a signature of the native function stored in a linking mechanism to link a function call to the native function in the interpreted application to native code implementing the native function; and invoking the native code only if the signatures match.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The techniques disclosed herein are applicable to a scenario in which an interpreted program has one signature for a native function as declared (hereinafter referred to as the "as declared" signature) but the actual implementation of the native function in the native language has another signature for the function (hereinafter referred to as the "as implemented" signature). The implementation (code) of the native function is stored in a library which is compiled together with an interpreter for the interpreted program.

In use, the interpreter encounters a native function call to the native function and responds by loading the parameters for the native function based on the as declared signature for the native function into a machine stack. Thereafter, the underlying platform executes the code of the native function using the parameters on the machine stack. However, since the as declared signature does not match the as implemented signature, a result of the native function execution cannot be trusted, and in some cases may lead to a system failure.

In one embodiment of the present invention, the interpreter has a control mechanism that prevents the execution of the native function in cases where the as declared signature does not match the as implemented signature. In some cases, the interpreter causes a notification to be displayed to a user to indicate a condition where the as declared signature does not match the as implemented signature of the native function. In other cases, the interpreter attempts to locate alternative code for the interpreted program, wherein the as declared signature matches the as implemented signature of the native function. Other advantages of the techniques disclosed herein will become apparent from the description below.

Figure 1:
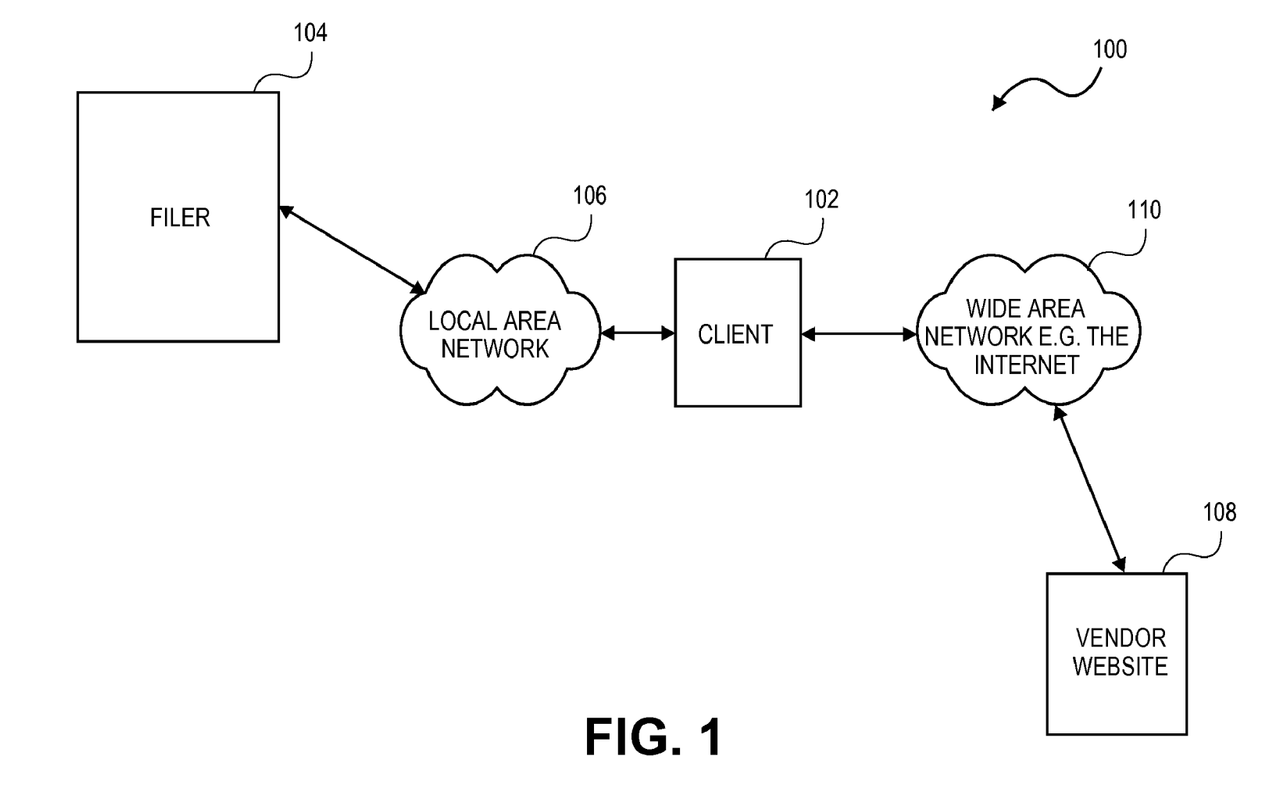
FIG. 1 shows the architecture of a network within which the techniques of the present invention may be implemented.

FIG. 1 of the drawings shows a network architecture 100 within which the scenario described above can occur, i.e., wherein the as declared signature of a native function in an interpreted program may not match the as implemented signature of the native function within a library available to an interpreter. The architecture 100 includes a client machine 102 which is connected to a file storage server (filer) 104 via a local area network 106. The filer 104 is a network storage appliance comprising a special-purpose computer that provides file services relating to the organization of information on storage devices, such as disks.

Figure 2:
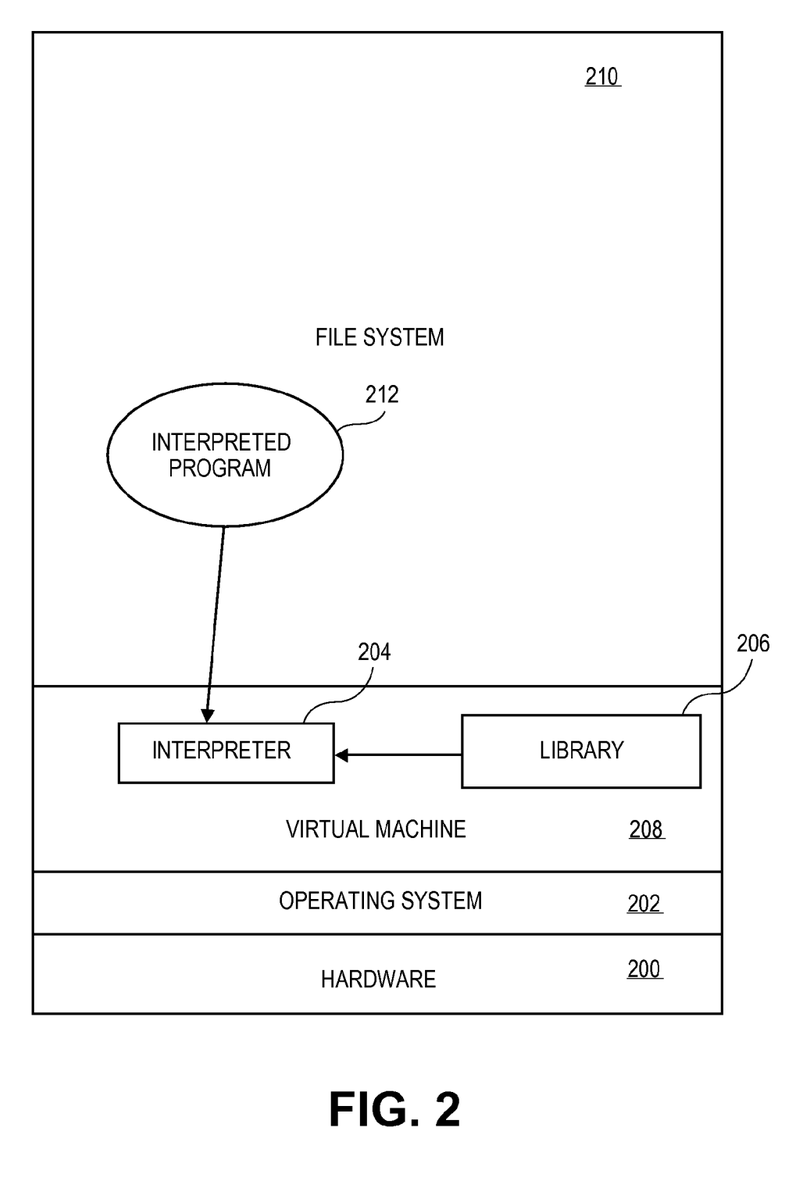
FIG. 2 shows the internal organization of the filer of FIG. 1.

The internal organization of the filer 104, according to one embodiment, is shown in FIG. 2 of the drawings. As will be seen, the filer 104 includes hardware 200 which is under control of an operating system 202. For example, the hardware 200 may include a microprocessor such as Intel Corporation's Pentium-class microprocessor and the operating system 202 may be an operating system available from Microsoft Corporation. The filer 104 further includes an interpreter 204 which has access to a library 206 which includes compiled code corresponding to native functions. The interpreter 204 may be an interpreter within a virtual machine 208 such as a Java Virtual Machine. In this case, the interpreter 204 is a bytecode interpreter and is used to interpret bytecodes. The filer 104 also includes a file system area 210 which stores the files of an interpreted program 212.

It may be the case that the file system area 210 including the interpreted program 212, the interpreter 204, and the library 206 are shipped together by the manufacturer to the customer. Thus, the as declared signature of the native function in the interpreted program 212 will correspond with the as implemented signature of the native function within the library 206. In this case when a function call instruction to the native function is executed by the interpreter 204, the interpreter 204 places the correct parameters required by the native function in the machine stack. However, it is likely that a user of the client machine 102 subsequently may wish to upgrade the software of the filer 104. For example, the user may establish a connection with a vendor website 108 via a wide area network such as the internet 110. The vendor website 108 is a website of a vendor of software for the filer 102. Using the connection with the vendor website 108, the user may download an upgraded version of the filer software to the client machine 102. Thereafter, the user uploads the upgraded version of the filer software from the client machine 102 to the filer 104. Specifically, the upgraded filer software is loaded into the file system 210 area of the filer 104, resulting in the interpreted program 212 being replaced with the upgraded version. However, the user may fail to recompile the interpreter 204 and the library 206. This failure potentially gives rise to the problem of the signatures of native functions as declared in the interpreted program 212 being out-of-sync or mismatched with corresponding as implemented signatures for the native functions within the library 206.

As noted above, in accordance with one embodiment of the invention, an interpreter such as interpreter 204 includes a control mechanism that prevents execution of a native function in cases where the as declared signature of the native function does not match the as implemented signature of the native function.

Figure 3:
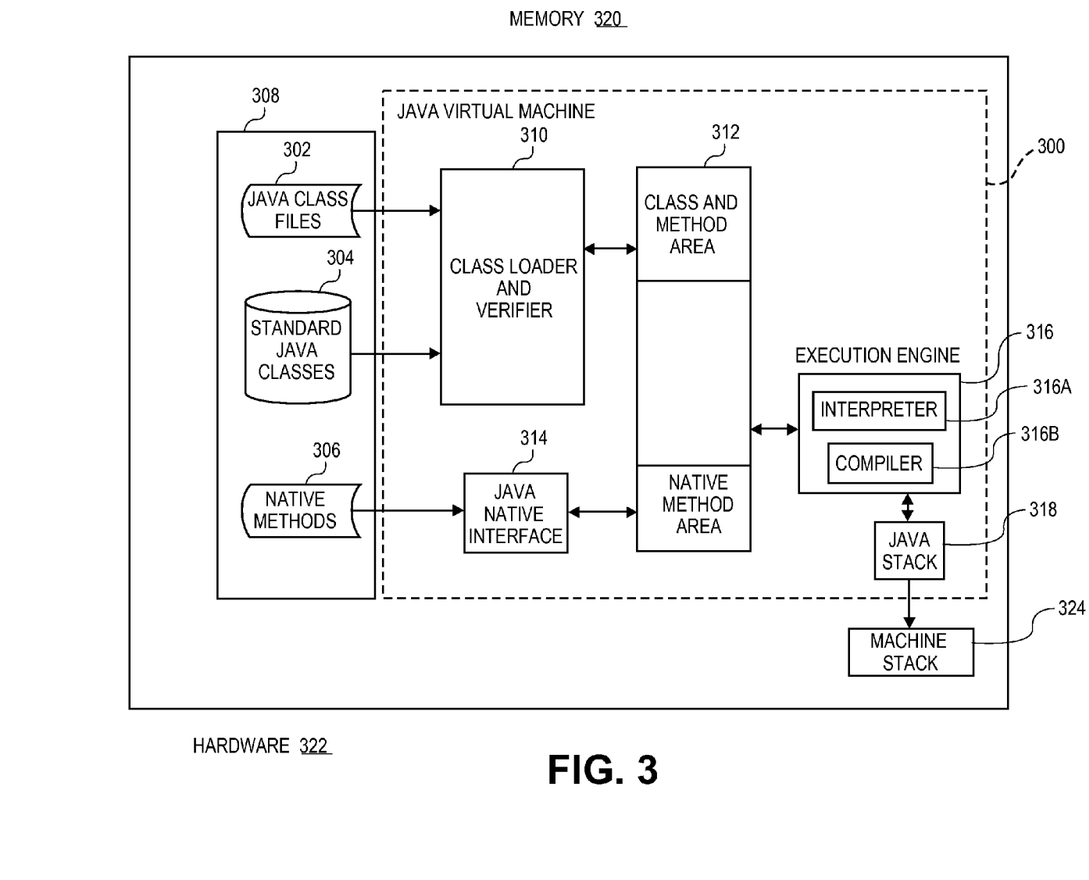
FIG. 3 shows a high-level block diagram of a virtual machine, in accordance with one embodiment of the invention.

FIG. 3 shows an example of a virtual machine in the form of a Java Virtual Machine 300 which includes an interpreter in accordance with one embodiment of the invention. The Java Virtual Machine 300 receives input of Java class files 302, standard built-in Java classes 304, and native methods 306 in order to execute a Java (interpreted) program. The native methods 306 may be written in programming languages other than the Java programming language. The native methods are typically stored in dynamic link libraries (dlls) or shared libraries. The Java class files 302 define code for the interpreted program and are in a machine independent format known as bytecode.

Figure 4:
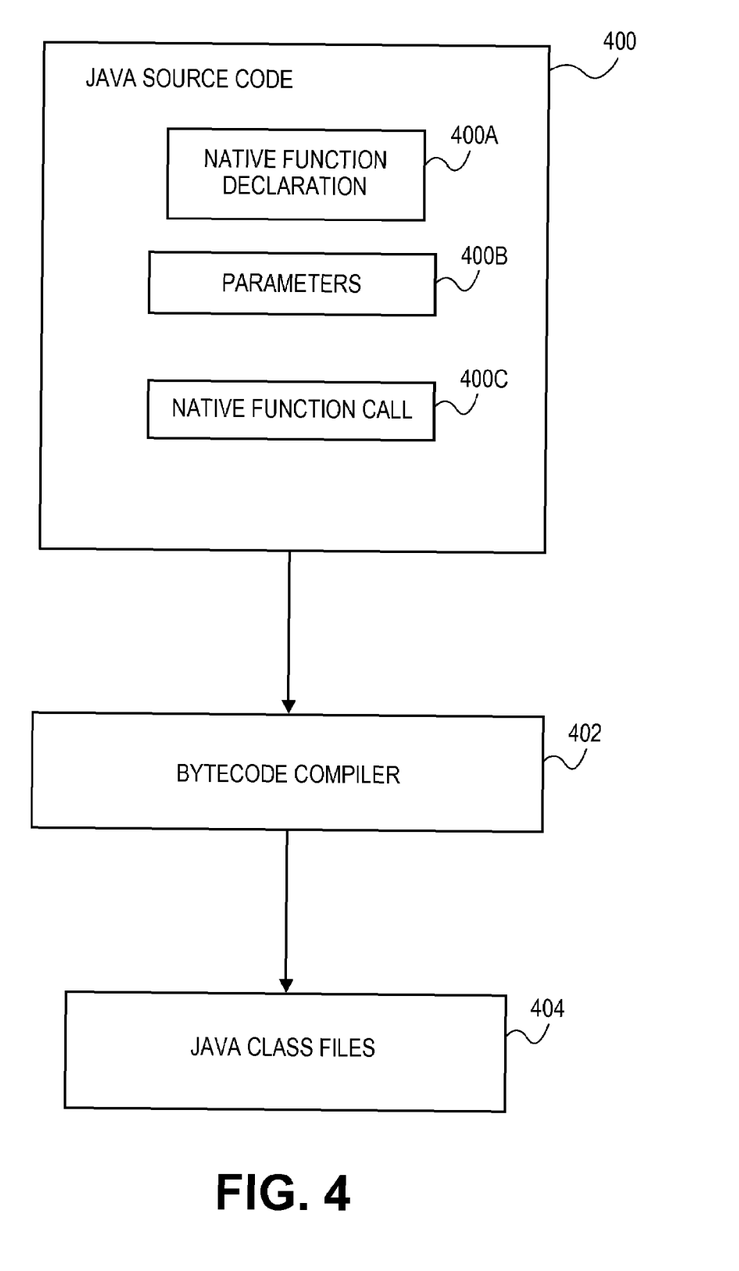
FIG. 4 illustrates how Java class files are produced.

FIG. 4 of the drawings illustrate how the Java class files 302 may be produced. Referring to FIG. 4, Java source code 400 is compiled by a bytecode compiler 402 to produce the Java class files 404. For the purposes of this description, it is assumed that the Java source code 400 includes a native function declaration 400A, parameters 400B to be passed to the native function when it is called, and a native function call instruction 400C.

Referring again to FIG. 3 of the drawings, it will be seen that the Java Virtual Machine 300 also includes an interface with an operating system 308, which provides the Java Virtual Machine 300 with interfaces to the Java class files 302, the standard built-in Java classes 304, and the native methods 306.

A dynamic class loader and verifier 310 loads the Java class files 302 and the standard built-in Java classes 304 into a memory 312. The dynamic class loader and verifier 308 verifies the correctness the bytecode in the Java class file 302.

A Java Native Interface (JNI) 314 links in the native methods 306 via the operating system 308 into the Java Virtual Machine 300 and stores the native methods in the memory 312. The memory 312 includes a class and method area for the Java classes, and a native method area for the native methods. The class and method area in the memory 312 is stored in a garbage-collected heap. As new objects are created, they are stored in the garbage-collected heap.

Further, the Java Virtual Machine 300 also includes an execution engine 316. The execution engine 316 executes instructions stored in the memory area 312 and may be implemented in software, hardware or combination of the two. Execution engine 316 supports object-oriented applications. The execution engine 316 includes both an interpreter 316A and a compiler 316B. The execution engine 316 may compile methods or portions of methods to increase the performance of the Java Virtual Machine 300.

The Java Virtual Machine 300 further includes a Java stack 318 which is used to store or stack parameters as will be described. The Java Virtual Machine 300 and the operating system 308 are implemented within a memory 320 located within hardware 322. Hardware 322 typically includes components found within a general purpose compute, e.g., a processor, input/output devices, etc. Since these components will be known to one skilled in the art, they are not further described.

Figure 5:
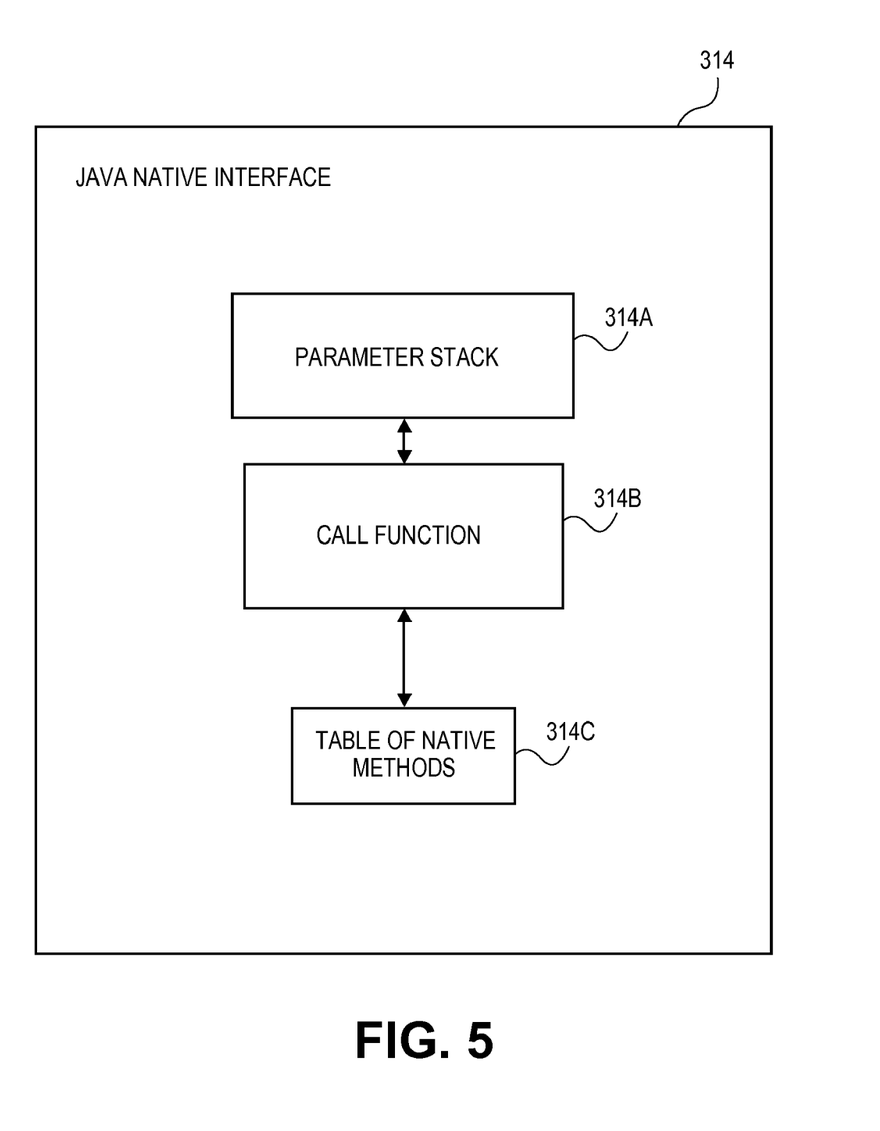
FIG. 5 shows the components within the Java Native Interface shown in FIG. 3 of the drawings.

FIG. 5 shows the components within the Java Native Interface 314. Referring to FIG. 5, it will be seen that the Java Native Interface 314 includes a parameter stack 314A, a call function 314B, and a linking mechanism comprising a table of native methods 314C. The function of each of the components of the Java Native Interface 314 will be explained below. As noted above, with reference to FIG. 4 of the drawings, the Java class files 302 comprise the interpreted program in the form of a sequence of bytecodes. Each bytecode represents, among other things, a Java Virtual Machine instruction or a parameter 400B for an instruction. One type of instruction in the interpreted program includes the native function call 400C. Preceding the native function call instruction 400C are instructions relating to the parameters 400B to be used with the native function call instruction 400C. These instructions, when executed, cause the parameters 400B to be loaded into the Java stack 318. The parameters 400B may be variable indicators or actual values. The parameter stack component 314A of the Java Native Interface 314 retrieves the parameters 400B from the Java stack 318 and places the parameters in a machine stack 324 of the hardware 322 (see FIG. 3). The call function component 314B acquires the address of a native function 306 and makes a jump to that address, after the interpreter 316A verifies that the as declared signature of the native function 306 corresponds with the as implemented signature of the native function 306.

Figure 6:
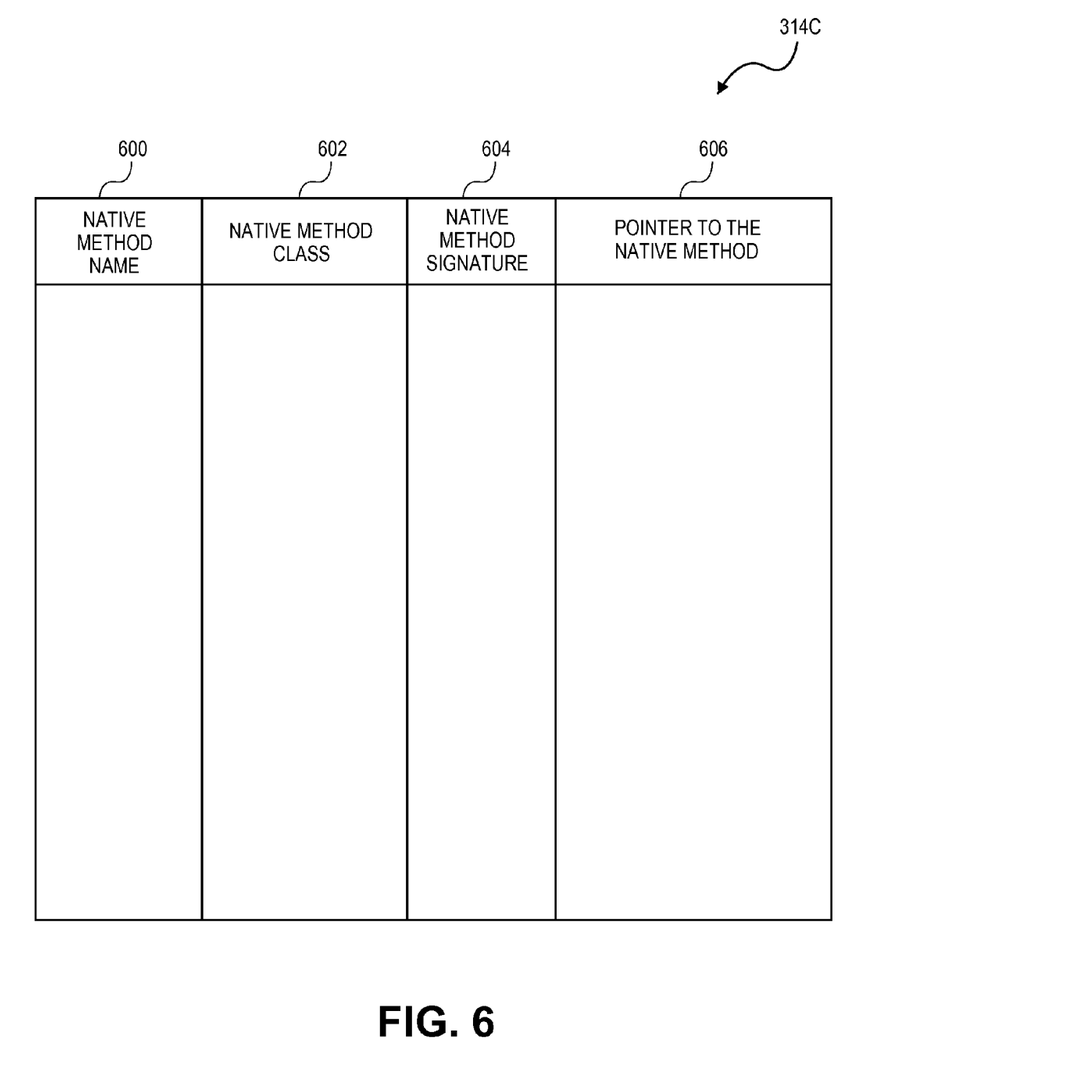
FIG. 6 shows one embodiment of a table of native methods.

The details, in accordance with one embodiment, of how the interpreter 316A performs the verification will now be described. FIG. 6 shows one embodiment of the table of native methods 314C. The table of native methods 314C includes a native method name column 600, a native method class column 602, a native method signature (as declared) column 604, and a pointer to the native function column 606. Thus, the table of native functions 314C defines a mapping between a native method's name, class, signature, and a pointer to the native method. The signatures contained in the native method signature column 604 are obtained, in one embodiment, from the "AClassWithNativeMethods.h" file generated using the javah tool. The table of native functions 314C is generated at compile time when the interpreter 316A and its libraries are compiled. The interpreter 316A includes a control mechanism to control calls to native functions by an interpreted application, based on the table of native functions 314C.

Figure 7:
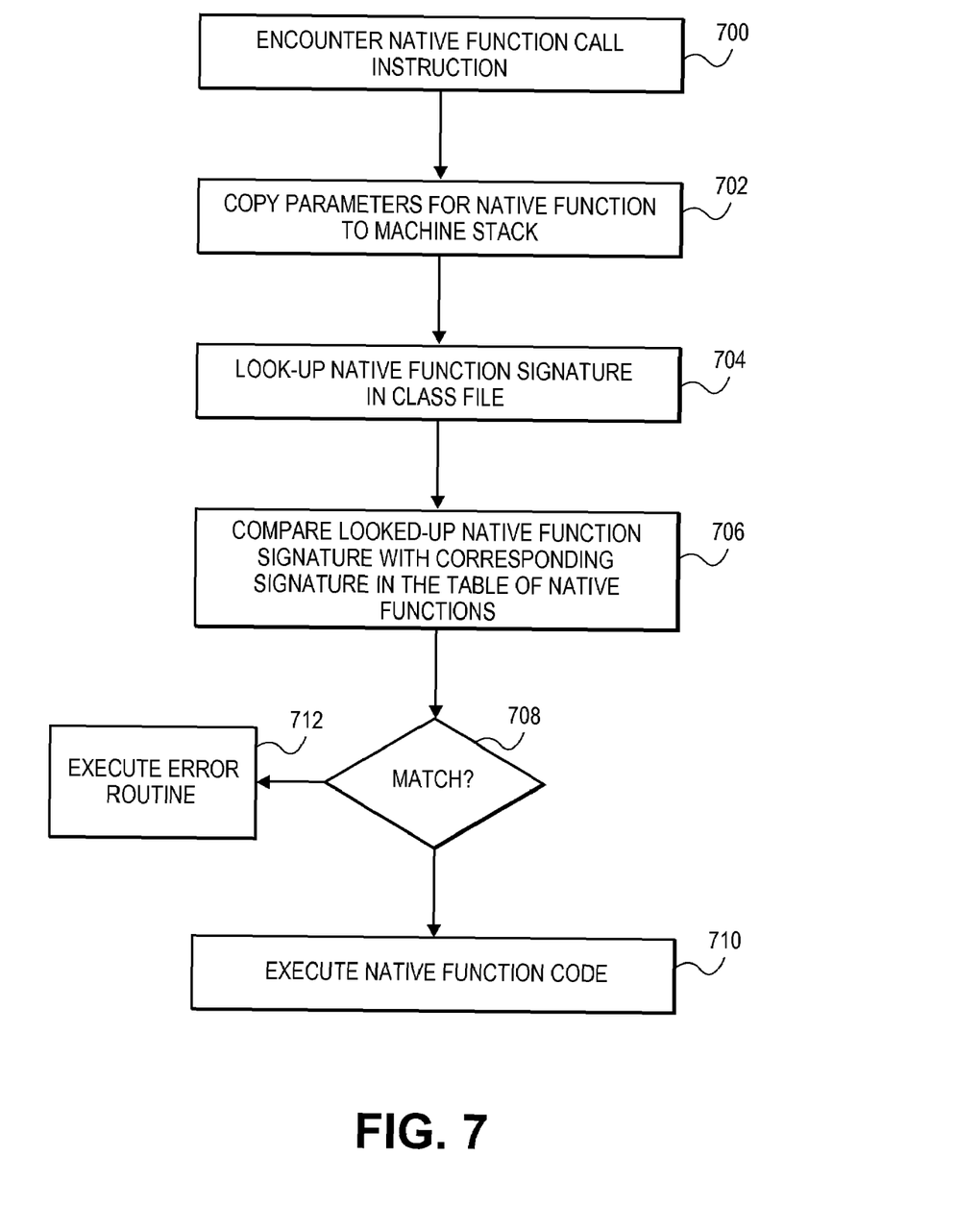
FIG. 7 shows a flowchart of operations performed by a control mechanism within an interpreter, in accordance with one embodiment of the invention.

FIG. 7 shows a flowchart of operations performed by the control mechanism, in accordance with one embodiment.

Referring to FIG. 7, at block 700, the interpreter 316A encounters the native function call instruction 400C. At block 702, the interpreter 316A copies the parameters 400B for the native function to the machine stack 324. At block 704, a look-up of the native function's signature from the class file in the memory 312 is performed. At block 706, the looked-up native signature is compared with the corresponding signature in the table of native functions 314C. At block 708, if the looked-up native function signature, corresponding to the as declared native function signature, matches the native function signature in the table 314C, corresponding to the as implemented signature, then program control is transferred to block 710, wherein the native function code is executed. If there is no match then program control is transferred to block 712 in which an error routine is executed.

According to embodiments of the invention, the error routine may include code which when executed notifies a user of the mismatch between the as declared signature and the as implemented signature, or attempts to locate an updated class file that contains an as declared signature which corresponds to the as implemented signature of the native method. For example, an exception may be thrown to inform a user of the mismatch condition or the interpreter 316A may cause the system to attempt to download a version of the class file that has an as declared signature that corresponds with the as implemented signature of the native method.

In another embodiment, the error routine may include code which when executed prompts or notifies the user to update the linking mechanism/table of native functions in the interpreter so that the signature of the native function stored in the table matches the signature of the native function as declared in the code for the native application.

Although the techniques disclosed herein have been described with reference to a Java interpreter, it will be understood by one skilled in the art that these techniques are equally applicable to other types of interpreters and even to emulators.

Further, it will be evident to one skilled in the art that various modifications and changes can be made to the techniques disclosed herein, without departing from the broader spirit of the invention as set forth in the claims. Accordingly, the specification and drawings are to be regarded in an illustrative sense rather than in a restrictive sense.

What is claimed is:

1. A method of implementing an interpreter, the method comprising:
   determining, during runtime of an interpreted application, whether a signature of a native function declared in the interpreted application matches a signature of the native function stored in a linking mechanism which links a function call to the native function in the interpreted application to native code implementing the native function; and
   invoking the native code in response to the function call in the interpreted application if the signatures match.

2. The method of claim 1, wherein the linking mechanism comprises a table which includes a mapping of a name of the native function to a signature of the native function, and to a pointer to the native code.

3. The method of claim 2, wherein the determining comprises performing a look-up of the signature of the native function as declared in the code for the interpreted application, and comparing the looked-up signature against a corresponding signature in the table.

4. The method of claim 3, wherein the look-up is performed at a time when the code for the interpreted application is being run.

5. The method of claim 2, wherein the table is constructed at a time when the interpreter is compiled.

6. The method of claim 1, wherein the interpreter is a Java interpreter within a Java Virtual Machine.

7. The method of claim 1, further comprising executing an error routine if the signatures do not match.

8. The method of claim 7, wherein the error routine comprises a function that generates an exception.

9. The method of claim 7, wherein the error routine comprises a routine to notify a user to update the linking mechanism so that the signature of the native function stored in the linking mechanism matches the signature of the native method as declared in the code for the interpreted application.

10. The method of claim 7, wherein the error routine comprises code to cause the interpreter to search for alternative code for the interpreted application in which a signature of the native function as declared in the alternative code matches the signature of the native function stored in the linking mechanism.

11. The method of claim 10, wherein the search for the alternative code comprises downloading the alternative code over a network connection.

12. A method of implementing an interpreter, the method comprising:
   building a table of native functions, each implemented in a native language, wherein the table includes a mapping of a name for a native function, to a signature for the native function, and to a pointer to native code implementing the native function; and defining a control mechanism to control, during runtime of an interpreted application, calls to the native function by the interpreted application, based on the table.

13. The method of claim 12, wherein the control mechanism performs a look-up of a signature of the native function based on a declaration of the native function in code for the interpreted application when a function call instruction to the native function is encountered; compares the looked-up signature with a corresponding signature in the table of native functions; and executes the function call instruction if the signatures match.

14. The method of claim 13, wherein the control mechanism executes an error routine if the signatures do not match.

15. The method of claim 14, wherein the error routine comprises code to cause the interpreter to search for alternative code for the interpreted application in which a signature of the native function as declared matches a signature of the native function stored in a table.

16. The method of claim 15, wherein the search for the alternative code comprises downloading alternative code over a network connection.

17. The method of claim 14, wherein the error routine comprises a routine to notify a user to update the table so that the signature of the native function stored in the table matches the signature of the native function as declared in the interpreted application.

18. The method of claim 12, wherein the interpreter comprises a Java interpreter within a Java Virtual Machine.

19. The method of claim 18, wherein the interpreted code comprises a Java class file.

20. An interpreter, comprising:
   a mechanism to determine, during runtime of an interpreted application, if a signature of a native function declared in the interpreted application matches a signature of the native function stored in a linking mechanism which links a function call to the native function in the interpreted application to the native code implementing the native function;
   a mechanism to invoke the native function in response to the function call in the interpreted application if the signatures match; and
   a mechanism to display a notification to a user if the declared signature does not match the implemented signature.

21. The interpreter of claim 20, wherein the linking mechanism comprises a table which includes a mapping of a name of the native function to a signature of the native function, and to a pointer to the native code.

22. A machine-accessible medium, having stored thereon a sequence of instructions, which if executed by a processing system causes the processing system to perform a process comprising:
   determining, during runtime of an interpreted application, if a signature of a native function declared in the interpreted application matches the signature of the native function stored in a linking mechanism which links a function call to the native function in the interpreted application to native code implementing the native function; and
   invoking the native code in response to the function call in the interpreted application if the signatures match.

23. The machine-accessible medium of claim 22, wherein the linking mechanism comprises a table which includes a mapping of a name of the native function to a signature of the native function, and to a pointer to the native code.

24. A computer system, comprising:
   a processor; and
   a memory coupled to the processor, the memory storing instructions which when executed by the processor cause the processor to perform a method comprising
   determining, during runtime of an interpreted application, if a signature of the native function declared in the interpreted application matches a signature of the native function stored in a linking mechanism which links a function call to the native function in the interpreted application to native code implementing the native function; and
   invoking the native code in response to the function call in the interpreted application if the signatures match.

25. The computer system of claim 24, wherein the linking mechanism comprises a table which includes a mapping of a name of the native function to a signature of the native function, and to a pointer to the native code.

26. A method for implementing an interpreter, comprising:
   encountering, during runtime of an interpreted application, a native function call instruction in the interpreted program;
   copying parameters for the native function to a machine stack;
   performing a look-up of a signature of the native function in a class file containing a declaration of the native function;
   comparing the looked-up native function signature with a signature of the native function in a table of native functions which was built when the interpreter was compiled;
   executing native code comprising the native function if the signatures match; and
   executing an error routine if the signatures do not match.

27. An interpreter, which upon encountering a native function call instruction in an interpreted program, during runtime of an interpreted application, performs a method comprising:
   copying parameters for the native function to a machine stack;
   performing a look-up of a signature of the native function in a class file containing a declaration of the native function;
   comparing the looked-up native function signature with a signature of the native function in a table of native functions which was built when the interpreter was compiled;
   executing native code comprising the native function if the signatures match; and
   executing an error routine if the signatures do not match; and
   displaying a notification to a user if the declared signature does not match the implemented signature.

28. A machine-accessible medium, having stored thereon a sequence of instructions which if executed by a processing system, cause the processing system to perform a process comprising:
   encountering, during runtime of an interpreted application, a native function call instruction in the interpreted program;
   copying parameters for the native function to a machine stack;
   performing a look-up of a signature of the native function in a class file containing a declaration of the native function;

comparing the looked-up native function signature with a signature of the native function in a table of native functions which was built when the interpreter was compiled;

executing native code comprising the native function if the signatures match; and executing an error routine if the signatures do not match.

29. A computer system, comprising:

a processor;

a memory coupled to the processor, the memory storing instructions which when executed by the processor cause the processor to perform a method comprising encountering, during runtime of an interpreted application, a native function call instruction in the interpreted program;

copying parameters for the native function to a machine stack;

performing a look-up of a signature of the native function in a class file containing a declaration of the native function;

comparing the looked-up native function signature with a signature of the native function in a table of native functions which was built when the interpreter was compiled;

executing native code comprising the native function if the signatures match; and executing an error routine if the signatures do not match.

* * * * *